US008818783B2

(12) United States Patent
Novaes (10) Patent No.: US 8,818,783 B2
(45) Date of Patent: Aug. 26, 2014

(54) REPRESENTING STATE TRANSITIONS

(75) Inventor: Marcos Nogueira Novaes, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 13/246,248

(22) Filed: Sep. 27, 2011

(65) Prior Publication Data

US 2013/0080139 A1   Mar. 28, 2013

(51) Int. Cl.
    *G06F 17/50* (2006.01)
(52) U.S. Cl.
    USPC .............................................. 703/13
(58) Field of Classification Search
    USPC ........... 703/6, 13, 14; 717/124; 706/46, 50;
                  713/1; 348/14.01; 702/179; 705/7.11;
                  700/12
    See application file for complete search history.

(56) References Cited

U.S. PATENT DOCUMENTS

| | | | |
|---|---|---|---|
| 5,623,680 A * | 4/1997 | Flora-Holmquist et al. ... | 712/232 |
| 7,472,101 B2 * | 12/2008 | Aurora et al. .................. | 706/46 |
| 7,729,933 B2 | 6/2010 | Ye et al. | |
| 2004/0083011 A1 * | 4/2004 | Ganz et al. ..................... | 700/19 |
| 2008/0109431 A1 * | 5/2008 | Kori ................................. | 707/6 |
| 2009/0024514 A1 | 1/2009 | Kumaran et al. | |
| 2009/0083711 A1 | 3/2009 | Singh et al. | |
| 2010/0082958 A1 * | 4/2010 | Olmino ............................ | 713/1 |
| 2010/0235814 A1 * | 9/2010 | Ohta et al. ..................... | 717/124 |
| 2011/0054639 A1 * | 3/2011 | Pazzi ............................... | 700/12 |
| 2011/0119221 A1 * | 5/2011 | Mishra et al. .................. | 706/50 |
| 2011/0125695 A1 * | 5/2011 | Ruehle ............................. | 706/46 |
| 2011/0320228 A1 * | 12/2011 | Kowalski ...................... | 705/7.11 |
| 2012/0069131 A1 * | 3/2012 | Abelow ...................... | 348/14.01 |
| 2012/0290261 A1 * | 11/2012 | Genta ............................ | 702/179 |

OTHER PUBLICATIONS

Ling,Z.; "Design of collaborative workflow system based on UML state model"; IEEE/2009 Interna'l Forum on Computer Sci-Tech & Apps(IFCSTA); pp. 235-238; Dec. 27, 2009.
Lu, J.-et al.; "State machine workflow modeling and dataflow analysis"; 2008 IEEE Symposium on Advanced Management Information . . . (AMIGE); 5 pp.; Dec. 22, 2008.
Cover, R.; "Standards for Business Process Modeling, Collaboration, and Choreography"; Technology Reports; http//xml.coverpage.org; Oct. 15, 2004.
Jorgensen, H.; "12 Different Ways to Model Business Processes"; Models and Standards, Active Knowledge Modeling; Mar. 31, 2009.

* cited by examiner

*Primary Examiner* — Kandasamy Thangavelu
(74) *Attorney, Agent, or Firm* — Steven L. Nichols; Van Cott, Bagley, Cornwall & McCarthy, P.C.

(57) ABSTRACT

A method for representing state transitions within a state machine includes representing a set of allowed transitions between states as a transition pair wherein a first value of the transition pair indicates a set of nodes from which to transition and a second value of the pair indicates a set of nodes to which to transition. The nodes represent states within a state machine. The method further includes defining a role of an entity within the state machine by assigning a number of transition pairs to the entity, the value pairs defining how the entity can transition through the state machine.

20 Claims, 8 Drawing Sheets

Transition Pair (400)

{ First Value (404) , Second Value (406) }

*Fig. 4A*

Table (408)

| 1 | { 1 , 4 } |
| 2 | { 1 , [2, 3, 4] } |
| 3 | { [2, 5, 6] , 3 } |
| 4 | { * , 1 } |
| 5 | { (B) , * } |

*Fig. 4B*

State Transition Matrix
(500)

|   | 1 | 2 | 3 | 4 | 5 | 6 |
|---|---|---|---|---|---|---|
| 1 | 1 | 1 | 1 | 0 | 0 | 0 |
| 2 | 0 | 1 | 0 | 1 | 0 | 0 |
| 3 | 0 | 0 | 1 | 0 | 0 | 1 |
| 4 | 0 | 1 | 0 | 1 | 1 | 0 |
| 5 | 0 | 0 | 1 | 0 | 1 | 0 |
| 6 | 1 | 0 | 1 | 0 | 0 | 1 |

Columns (504)

Rows (502)

(506) Cell

*Fig. 5*

Table
(600)

| Roles | Assignment |
|---|---|
| Role A | { 1 , [2, 5] } AND { 2 , * } |
| Role B | { * , 1 } AND [ F ] |
| Role C | { [1, 3, 4] , [1, 2, 5, 6] } |
| Role D | { * , * } |

Role Column (602) — Roles

Assignment Column (604) — Assignment

With a physical computing system, represent a set of allowed transitions between states as a transition pair wherein a first value of the transition pair indicates a set of nodes from which to transition and a second value of the pair indicates a set of nodes to which to transition, the nodes representing states within a state machine (block 802)

With the physical computing system, define a role of an entity within the state machine by assigning a number of transition pairs to the entity, the transition pairs defining how the entity can transition through the state machine (block 804)

*Fig. 8*

REPRESENTING STATE TRANSITIONS

BACKGROUND

Aspects of the present invention relate in general to state machines, and more particularly, to methods for representing transitions between states within those state machines. A state machine is a model that can describe a variety of human or computer processes. The state machine defines several states in which the process may exist. The transitions between states may involve both conditions and actions. The conditions define what has to be in order to cause a transition between states. Actions define what takes place during the transition. For example, a state machine may model a door that is in either an open state or a closed state. While the door is in a closed state, conditions for a transition to an open state may be a turn of the doorknob and a force placed against the door. The actions involved in the transition to an open state involve the actual movement of the door.

State machines are often used to model complex processes. These processes may involve human processes, machine processes, or a combination of both. Various computer applications may be used to develop and represent such complex state machines. These state machines may be represented graphically to a user. In general, nodes are used to represent states while vertices between those nodes represent conditions and actions associated with a transition between states. One limitation of such state machines is that they only allow for specifically defined transitions between particular states. In some cases, it may be desirable to define transitions from each state to every other state within the state machine. This may especially be the case for state machines that model human processes. However, it can be time consuming and cumbersome for a developer of the state machine to define each transition between every state.

BRIEF SUMMARY

A method for representing state transitions within a state machine includes, with a physical computing system, representing a set of allowed transitions between states as a transition pair wherein a first value of the transition pair indicates a set of nodes from which to transition and a second value of the pair indicates a set of nodes to which to transition, the nodes representing states within a state machine, and with the physical computing system, defining a role of an entity within the state machine by assigning a number of transition pairs to the entity, the transition pairs defining how the entity can transition through the state machine.

A computing system includes a processor and a memory communicatively coupled to the processor. The processor is configured to represent a set of allowed transitions between states as a transition pair wherein a first value of the transition pair indicates a set of nodes from which to transition and a second value of the pair indicates a set of nodes to which to transition, the nodes representing states within a state machine and define a role of an entity within the state machine by assigning a number of transition pairs to the entity, the transition pairs defining how the entity can transition through the state machine.

A computer program product for representing transitions between states in a state machine includes a computer readable storage medium having computer readable code embodied therewith, the computer readable program code includes computer readable program code configured to represent a set of allowed transitions between states as a transition pair wherein a first value of the transition pair indicates a set of nodes from which to transition and a second value of the pair indicates a set of nodes to which to transition, the nodes representing states within a state machine and computer readable program code configured to define a role of an entity within the state machine by assigning a number of transition pairs to the entity, the transition pairs defining how the entity can transition through the state machine.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

As mentioned above, one limitation of such state machines is that they only allow for specifically defined transitions between particular states. In some cases, it may be desirable to define transitions from each state to every other state within the state machine. This may especially be the case for state machines that model human processes. However, it can be time consuming and cumbersome for a developer of the state machine to define each transition between every state.

In light of this and other issues, the present specification discloses methods and systems for efficiently representing transitions between states within a state machine. Such representations will simplify the task of developing such models when using state machine modeling applications. Such representations also allow for easily defining the roles of entities involved in the process that is modeled by the state machine.

According to certain illustrative examples, a transition within a state machine can be represented by a transition pair. The transition pair includes a first value and a second value. The first value describes a node or set of nodes from which a transition can be made. The second value describes a node or set of nodes to which a transition can be made. For example, the transition pair {1, [2, 3, 4]} indicates that from node 1, a transition can be made to either node 2, node 3, or node 4. In some cases, various identifiers can be used to indicate all states or particular subset of states. For example, the transition pair {*, 1} indicates that a transition can be made from any node back to node 1. In a further example, the transition pair {*, *} indicates that a transition can be made from any state to any other state.

By representing transitions in such a manner, a user can easily define transitions within a state machine modeling application. Specifically, the user does not have to individually define each transition. Furthermore, by simply representing transitions as transition pairs, a state machine developer can assign roles to entities which may navigate the state machine. For example, a state machine may model a particular business operation. Various human roles are typically involved in such business operations. A supervisor may be able to transition the process between states differently than a worker. Thus, different entities may be assigned roles using the above described manner of representing transitions. For example, a particular type of worker may be assigned a role using the expression: role A={1, [1,3,4,7]}. In a further example, a manager may be assigned a role using the expression: role M={*,*}. Defining transitions and roles in such a manner provides an efficient manner of representation.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
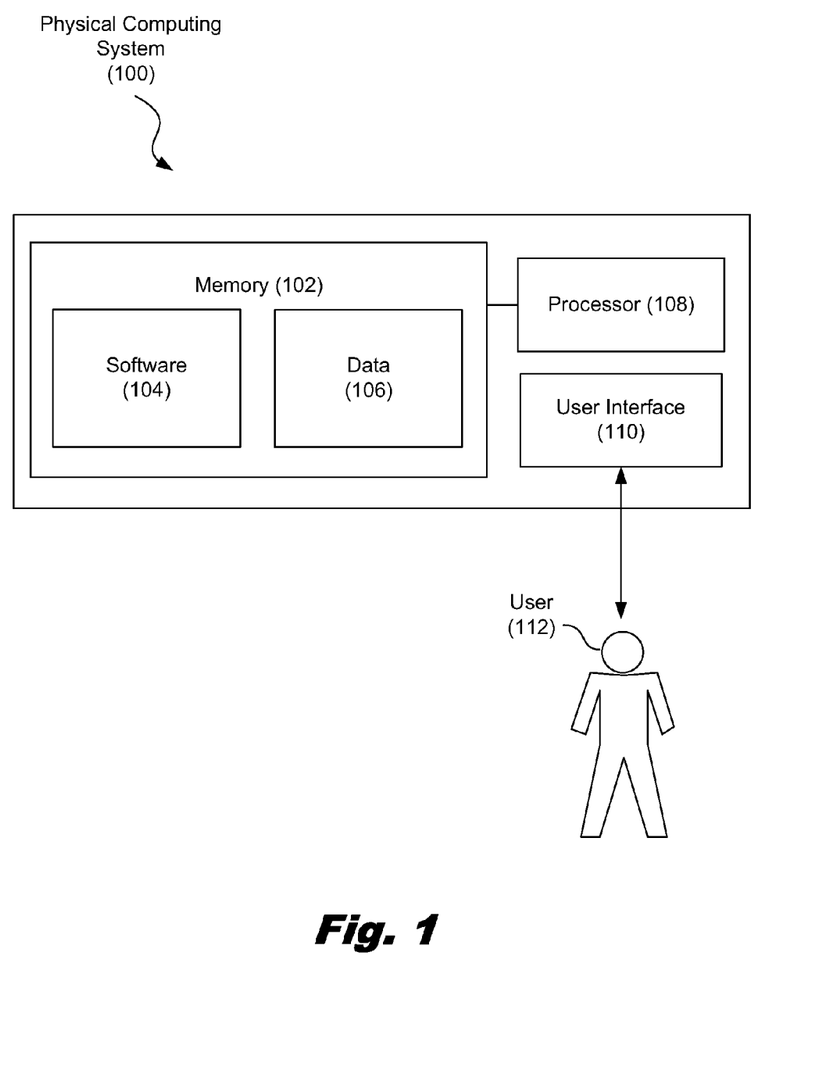
FIG. 1 is a diagram showing an illustrative physical computing system, according to one example of principles described herein.

Referring now to the figures, FIG. 1 is a diagram showing an illustrative physical computing system (100) that can be used for state machine development. According to certain illustrative examples, the physical computing system (100) includes a memory (102) having software (104) and data (106) stored thereon. The physical computing system (100) also includes a processor (108) and a user interface (110).

There are many types of memory available. Some types of memory, such as solid state drives, are designed for storage. These types of memory typically have large storage volume but relatively slow performance. Other types of memory, such as those used for Random Access Memory (RAM), are optimized for speed and are often referred to as "working memory." The various forms of memory may store information in the form of software (104) and data (106).

The physical computing system (100) also includes a processor (108) for executing the software (104) and using or updating the data (106) stored in memory (102). The software (104) may include an operating system. An operating system allows other applications to interact properly with the hardware of the physical computing system. Such other applications may include those which are designed to develop state machine models.

A user interface (110) may provide a means for the user (112) to interact with the physical computing system (100). The user interface may include any collection of devices for interfacing with a human user (112). For example, the user interface (110) may include an input device such as a keyboard or mouse and an output device such as a monitor.

Figure 2A:
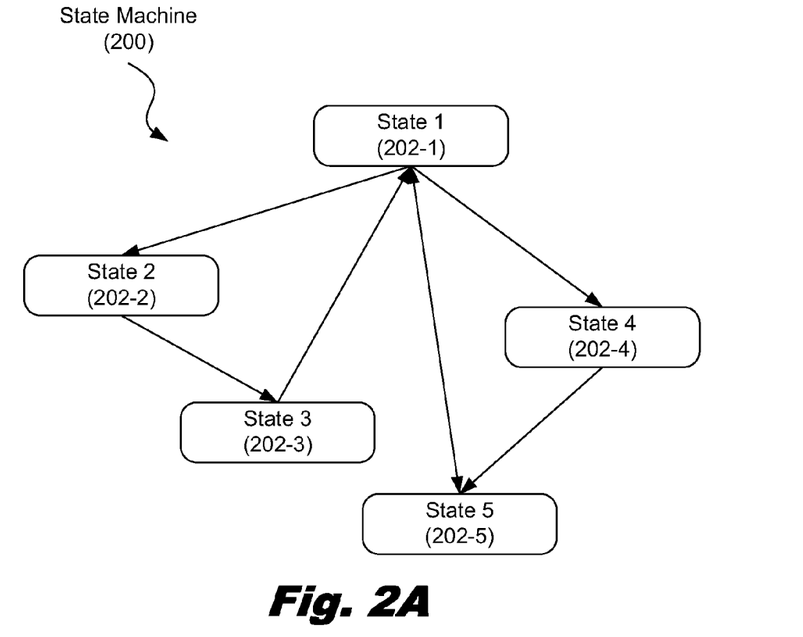
FIG. 2A is a diagram showing an illustrative general state machine model, according to one example of principles described herein.

FIG. 2A is a diagram showing an illustrative general state machine model (200). As mentioned above, a state machine is often represented by a number of nodes. These nodes represent the various states in which the state machine may exist. The vertices connecting the nodes define the transitions between the states. A transition between states involves both pre-conditions and actions. The pre-conditions define what has to happen to cause the transition and the actions define what happens during the transition to bring the state machine to the next state.

In the example shown in FIG. 2A, State 1 (202-1) can be defined as an initial state. From this initial state, the state machine can transition to either State 2 (202-2), State 4 (202-4) or state 5 (202-5). From State 2 (202-2), the state machine can transition to State 3 (202-3) and from there back to State 1 (202-1). From State 4 (202-4), the state machine can transition to State 5 (202-5) and from there back to state 1 (202-1).

Figure 2B:
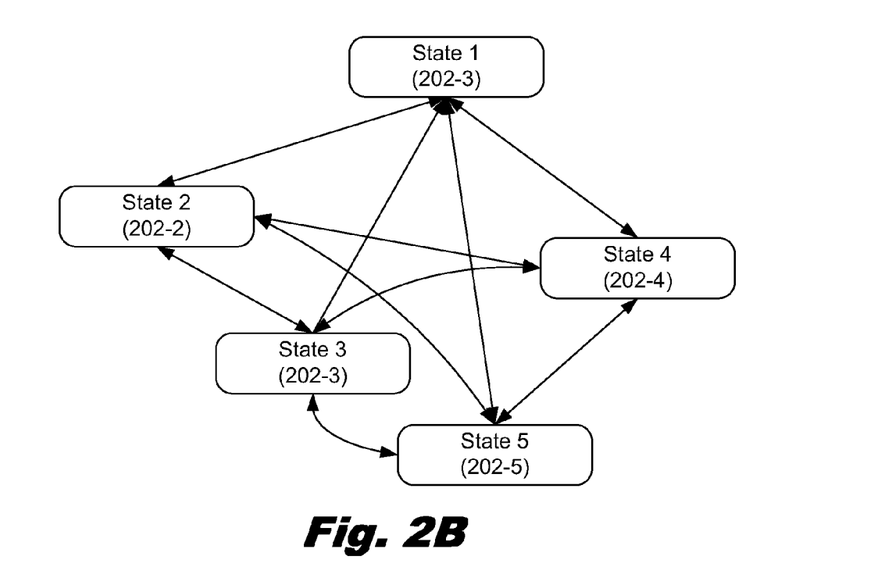
FIG. 2B is a diagram showing an illustrative state machine model wherein each state can transition to any other state, according to one example of principles described herein.

FIG. 2B is a diagram showing an illustrative state machine model wherein each state can transition to any other state. As mentioned above, in some cases, state machines model human workflows. Thus, more flexibility is often desired. Thus, it is sometimes preferred to allow mechanisms for the state machine to transition from any state to any other state. As can be seen from FIG. 2B, this produces an excessive amount of vertices. This can be especially cumbersome for large and complex state machines involving hundreds or thousands of states.

Figure 3:
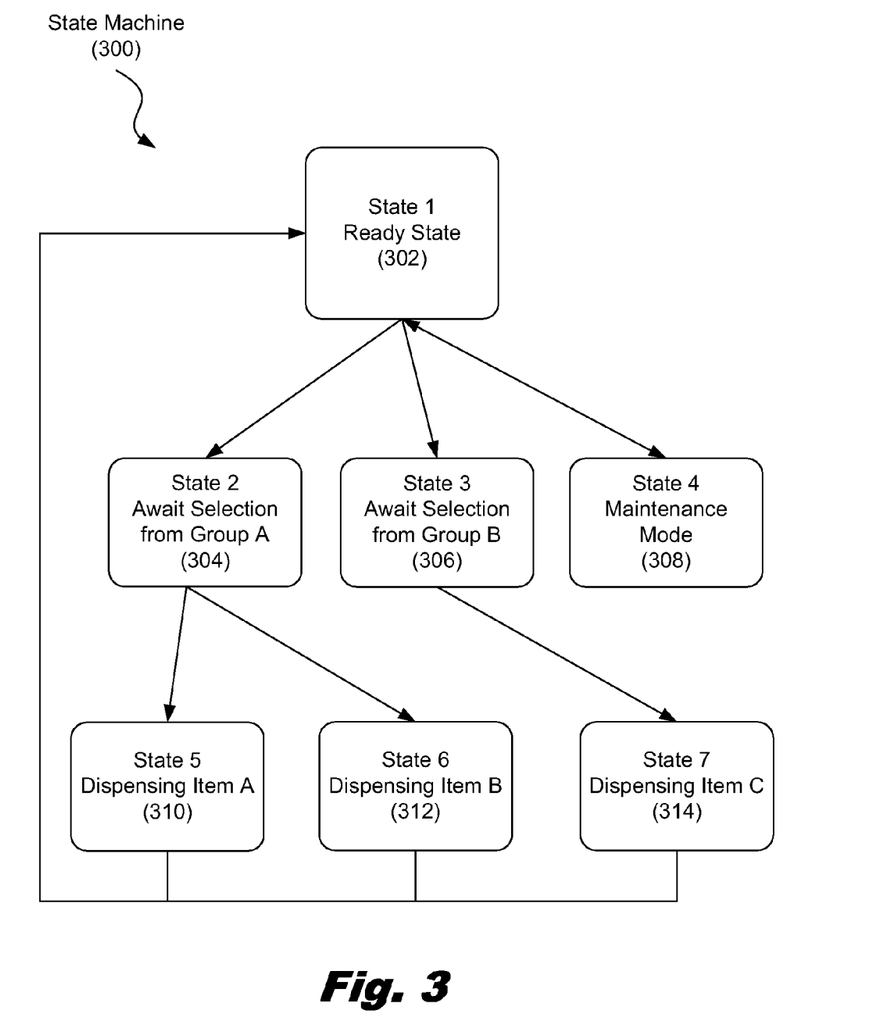
FIG. 3 is a diagram showing an illustrative example of a state machine model, according to one example of principles described herein.

FIG. 3 is a diagram showing an illustrative example of a state machine model. According to one example, a state machine model may be used to model the operation of a vending machine. The following example is simply to illustrate a process that may be modeled with a state machine.

In its default state, the vending machine may be in a ready state (302). In response to various human based actions, the vending machine may transition to a different state. For example, if a human user puts in a certain amount of money, then the vending machine will transition to state 2. In this state, the vending machine is awaiting a selection from the user as to which item he or she desires to purchase. If the user puts a different amount of money into the vending machine, then the state machine transitions to state 3 (306) to await a selection from the user from group B. Thus, the pre-conditions for causing the transition between states are a human user putting money into the vending machine. The actions made during the transitions are the execution of whatever hardware and software systems within the vending machine are used to await a particular selection from the user.

While in either state 2 (304) or State 3 (306) the state machine waits for a response from the user as to which selection from the appropriate group he or she chooses. In response to such user input, the state machine will transition to State 5 (310), State 6 (312), or State 7 (314). During these states, the vending machine is dispensing the selected item. Upon completion of dispensing the item, the state machine will transition back to the default ready state, State 1 (302). Thus, the pre-conditions for transitioning back to the initial state are completion of the dispensing process.

The state machine may also include a maintenance state (308) wherein an operator of the vending machine has the ability to initiate this state for various maintenance or restocking purposes. The pre-conditions for transitioning to such a state may include a test for determining that the person attempting to enter maintenance mode is authorized to do so.

As mentioned above, one issue with using state machines to model complex processes is that each transition allowed has to be carefully defined. In some cases, it is desirable that a state machine have some mechanism for forcing a transition between states where there is not normally a process related transition. Representing possible transitions from every state to every other state can be very difficult. When represented graphically, the vertices between nodes can become too numerous to distinguish. When represented as a list associated with each node, the lists become quite large. These issues increase as the size and complexity of the state machine increases. In light of this issue, the present specification discloses a method for efficiently representing allowed transitions between states within a state machine.

Figure 4A:
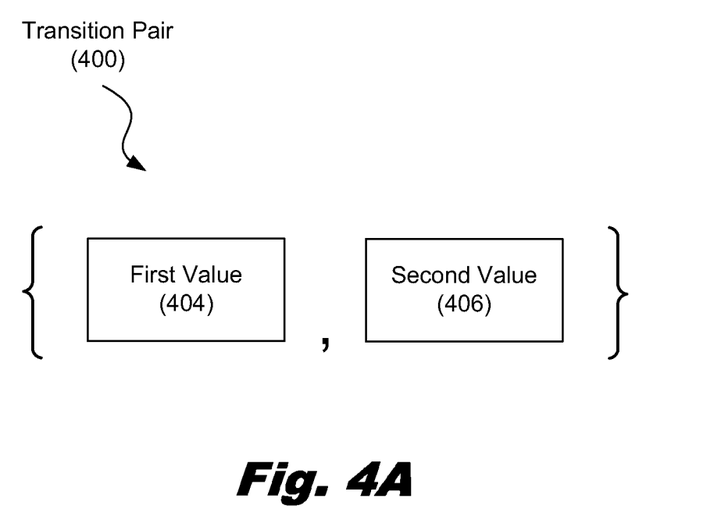
FIG. 4A is a diagram showing an illustrative transition pair, according to one example of principles described herein.

FIG. 4A is a diagram showing an illustrative transition pair (400). According to certain illustrative examples, the transition pair (400) includes a first value (404) and a second value (406). In one example, the first value (404) and second value (406) are placed within brackets and separated by a comma. However, other methods of notation may be used to express the transition pair. The first value (404) defines either a single node or a set of nodes from which the state machine is able to transition. The second value (406) defines either a single node or a set of nodes to which the nodes indicated in the first value (404) can transition.

Figure 4B:
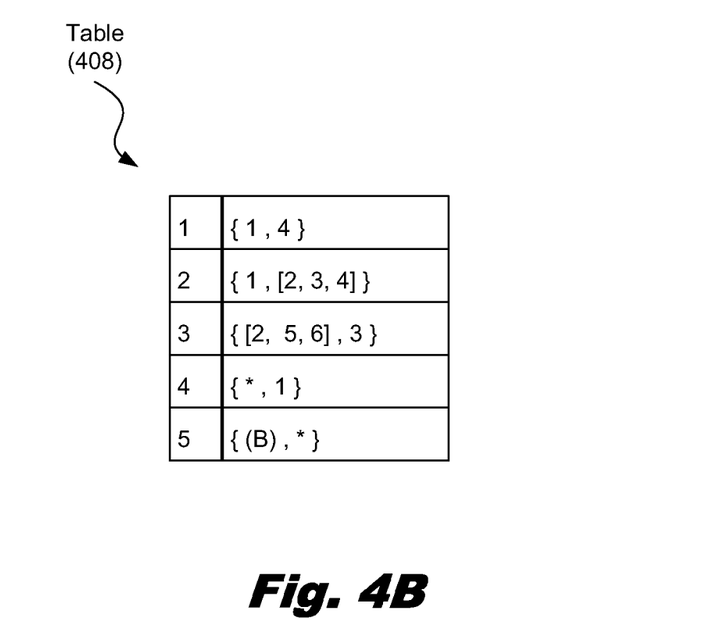
FIG. 4B is a diagram showing an illustrative table of transition pairs, according to one example of principles described herein.

FIG. 4B is a diagram showing an illustrative table of transition pairs. The transition pair in row 1 defines both the first value (404) and the second value (406) as a single node. Thus, this transition pair indicates that the state machine is able to transition from node 1 to node 4. The transition pair in row 2 defines the first value as a single node and the second value (406) as a set of nodes. This transition pair thus indicates that the state machine can transition from node 1 to either node 2, 3, or 4. The transition pair in row 3 defines the first value as a set of nodes and the second value (406) as a single node. This transition pair thus indicates that the state machine can transfer from either node 2, 5, or 6 to node 3.

In some cases, various indicators may be used in place of a node or set of nodes to indicate a previously defined set of nodes. For example, the * character may be used to indicate all nodes within the state machine. Thus, the transition pair in row 4 indicates that any node within the state machine can transition back to node 1. In another example, the developer of the state machine may create predefined sets. In this example, the predefined set is labeled with a letter inside of parentheses. Thus, the transition pair in row 5 indicates that from any of the nodes within predefined set B, the state machine can transition to any node.

Figure 5:
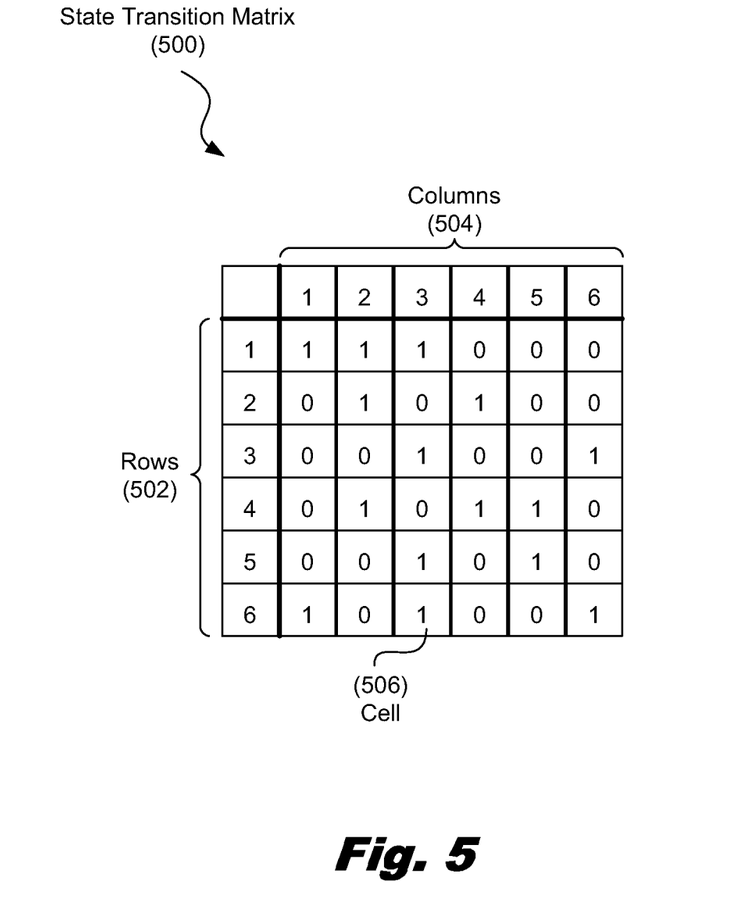
FIG. 5 is a diagram showing an illustrative transition matrix, according to one example of principles described herein.

FIG. 5 is a diagram showing an illustrative state transition matrix. In addition to representing transitions through use of the transition pairs described above, some transitions maybe represented through matrices. According to certain illustrative examples, a state transition matrix includes a number of rows and a number of columns. The rows represent nodes from which the state machine may transition and the columns represent nodes to which the state machine may transition. The cells (506) within the state transition matrix define whether or not a transition is allowed from the row of that cell to the column of that cell. For example, a transition is allowed from node 1 to node 3 because there is a '1' in row 1, column 3. Conversely, there is no transition allowed between node 5 and node 2 because there is a '0' in row 5, column 2.

Figure 6:
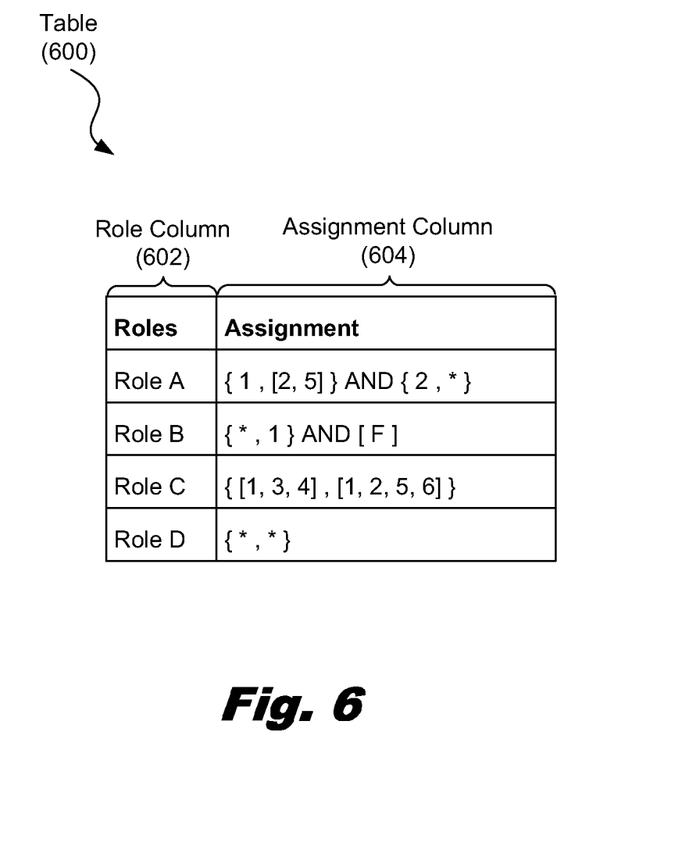
FIG. 6 is a diagram of a table showing illustrative assignment of roles to entities associated with a state machine model, according to one example of principles described herein.

FIG. 6 is a diagram of a table (600) showing illustrative assignment of roles to entities associated with a state machine model. By having an efficient method of representing state transitions within a state machine, roles can be assigned to entities using this method of representing transitions. For example, different entities may navigate through the state machine in different manners. Typically, defining how an entity may navigate a state machine involves conditions defined for each state transition. For example, the developer would have to explicitly state, for each transition, which entities can and cannot use that transition. However, by efficiently representing state transitions as defined above, user roles can be defined in a single expression.

According to certain illustrative examples, the table (600) includes a role column (602) and an assignment column (604). The role column defines specific roles which may be assigned to different entities. For example, using the vending machine example above, a customer may have a different role for navigating the state machine model than an operator of the vending machine. Specifically, the operator may have the ability to transition to the maintenance state. Additionally, the operator may be able to jump to any state without having to abide by certain conditions which the customer may have to abide by in order to transition to different states.

In one example, a role can be assigned using an expression such as role A={1, [2, 5]} AND {2, *}. Thus, the manner in which an entity having role A can transition through the state machine is defined by those transition pairs. Specifically, an entity with role A can transition from state 1 to both state 2 and 5. Additionally, that entity with role A may transition from state 2 to any state within the state machine.

In some cases, the assignment of the role of an entity may be defined, at least in part, by a state transition matrix. For example, role B={*, 1} AND [F]. Thus an entity with role B can transition from any state back to state 1 and may transition in any manner defined by state transition matrix F. In some cases, an entity may be given a universal role that allows that entity to transition from any state to any other state as defined by role D.

Figure 7:
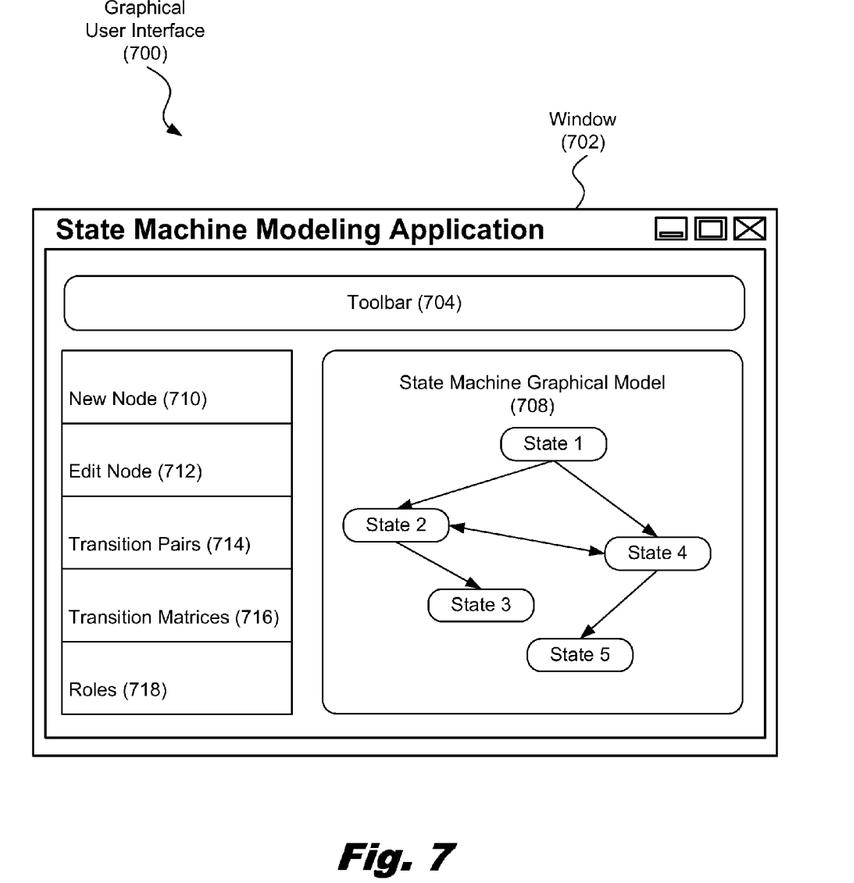
FIG. 7 is a diagram showing an illustrative graphical user interface for an application used to develop state machine models, according to one example of principles described herein.

FIG. 7 is a diagram showing an illustrative graphical user interface for an application used to develop state machine models. According to certain illustrative examples, the user interface (700) may be embodied in the form of a window (702). The user interface (700) may include a toolbar (704) and a graphical mode (708). The user interface may also include a new node control (710), an edit node control (712), a transition pairs control (714), a transition matrices control (716), and a roles control (718). The graphical user interface illustrated and described herein is a simple example of an interface and is not intended to limit the manner in which a graphical user interface embodying principles described herein should look or operate.

The toolbar includes the various options and tools that the developer may use to create a state machine model. The state machine graphical model (708) may display the current state machine or portion of that state machine to the developer. The various controls on the left side of the graphical user interface (700) provide various features to be used in the creation and development of a state machine.

The new node control (710) can be used to create a new node. With the creation of a new node, the developer can define a new state in which the state machine may exist. The developer can define the characteristics of theses states and what conditions and actions are associated with transitioning to and from them. The developer may edit these nodes using the edit node control (712).

The transition pairs control (714) allows the developer to enter in the expressions that represent transitions that are allowed within the state machine. The user may create new transition pairs and edit those pairs which have already been created. Although the transition pairs define which transitions are allowed, they do not define the conditions and actions associated with those transitions. If the developer wishes to define such conditions and actions, then he or she can proceed through each transition and do so. However, the developer can still be provided with an efficient representation of the allowed transitions through the transition pair expressions. The developer may also define state transition matrices using the transition matrices control (716).

The roles control (718) may allow the developer to assign roles to various entities associated with the state machine. The term "entity" when referring to those associated with a state machine refers to the type of persons or machine systems that may be involved in the state machine. For example, when referring to a business process, the entities may include managers of varying levels, and workers with different privileges. Each of these entities may be assigned roles using the expressions described above. These roles will define how those entities may navigate the state machine.

Figure 8:
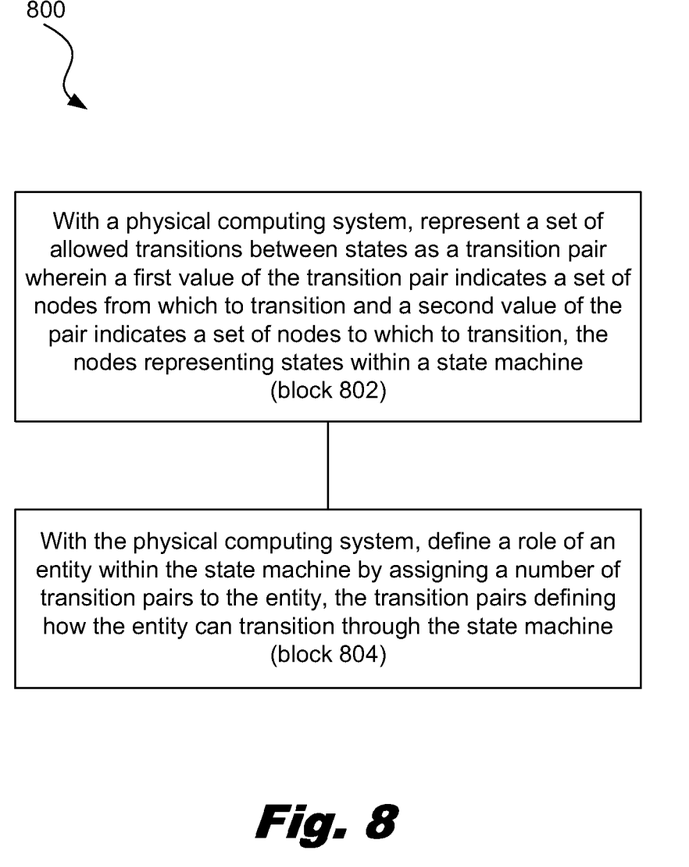
FIG. 8 is a flowchart showing an illustrative method for representing state transitions, according to one example of principles described herein.

FIG. 8 is a flowchart showing an illustrative method for representing state transitions. According to certain illustrative examples, the method includes, with a physical computing system, representing a set of allowed transitions between states as a transition pair wherein a first value of the transition pair indicates a set of nodes from which to transition and a second value of the pair indicates a set of nodes to which to transition, the nodes representing states within a state machine, and with the physical computing system, defining a role of an entity within the state machine by assigning a number of transition pairs to the entity, the transition pairs defining how the entity can transition through the state machine.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for representing state transitions within a state machine, the method comprising:
   with a physical computing system, representing a set of allowed transitions between states as a transition pair wherein a first value of said transition pair indicates a set of nodes from which to transition and a second value of said pair indicates a set of nodes to which to transition, said nodes representing states within a state machine; and
   with said physical computing system, defining a role of an entity within said state machine by assigning a number of transition pairs to said entity, said transition pairs defining how said entity transitions through said state machine.

2. The method of claim 1, further comprising, representing a subset of transitions within a state machine model in a matrix form, both columns and rows of said matrix representing a subset of states within said state machine, and a cell within said matrix indicating a transition between an associated row and associated column of said cell.

3. The method of claim 2, further comprising, assigning a connectivity matrix to said entity to define how said entity transitions through said state machine model.

4. The method of claim 1, wherein a transition pair is defined by a state machine model developer through a graphical user interface.

5. The method of claim 1, wherein at least one of said first value and said second value comprises a universal indicator that indicates all nodes within said state machine model.

6. The method of claim 1, wherein at least one of said first value and said second value comprises an indicator that indicates a predefined subset of nodes.

7. The method of claim 1, wherein said state machine model is represented in a business process management application.

8. The method of claim 1, wherein said state machine model represents, at least in part, a human workflow.

9. A computing system comprising:
   a processor; and
   a memory communicatively coupled to said processor;
   in which said processor is configured to:
      represent a set of allowed transitions between states as a transition pair wherein a first value of said transition pair indicates a set of nodes from which to transition and a second value of said pair indicates a set of nodes to which to transition, said nodes representing states within a state machine; and
      define a role of an entity within said state machine by assigning a number of transition pairs to said entity, said transition pairs defining how said entity transitions through said state machine.

10. The system of claim 9, wherein said processor is further configured to represent a subset of transitions within a state machine model in a matrix form, both columns and rows of said matrix representing a subset of states within said state machine, and a cell within said matrix indicating a transition between an associated row and associated column of said cell.

11. The system of claim 10, wherein said processor is further configured to assign a connectivity matrix to said entity to define how said entity transitions through said state machine model.

12. The system of claim 9, wherein a transition pair is defined by a state machine model developer through a graphical user interface.

13. The system of claim 9, wherein at least one of said first value and said second value comprises a universal indicator that indicates all nodes within said state machine model.

14. The system of claim 9, wherein at least one of said first value and said second value comprises an indicator that indicates a predefined subset of nodes.

15. The system of claim 9, wherein said state machine model is represented in a business process management application.

16. The system of claim 9, wherein said state machine model represents, at least in part, a human workflow.

17. A computer program product for representing transitions between states in a state machine, said computer program product comprising:
   a computer readable storage medium having computer readable code embodied therewith, said computer readable program code comprising:
      computer readable program code configured to represent a set of allowed transitions between states as a transition pair wherein a first value of said transition pair indicates a set of nodes from which to transition and a second value of said pair indicates a set of nodes to which to transition, said nodes representing states within a state machine; and
      computer readable program code configured to define a role of an entity within said state machine by assigning a number of transition pairs to said entity, said transition pairs defining how said entity transitions through said state machine.

18. The computer program product of claim 17, wherein said computer readable program code further comprises computer readable program code configured to represent a subset of transitions within a state machine model in a matrix form, both columns and rows of said matrix representing a subset of states within said state machine, and a cell within said matrix indicating a transition between an associated row and associated column of said cell.

19. The computer program product of claim 18, wherein said computer readable program code further comprises computer readable program code configured to assign a connectivity matrix to said entity to define how said entity transitions through said state machine model.

20. The computer program product of claim 17, wherein at least one of said first value and said second value comprises at least one of: a universal indicator that indicates all nodes within said state machine model and a subset indicator that indicates a predefined subset of nodes.

* * * * *